United States Patent
Carlavan et al.

(10) Patent No.: US 7,753,697 B2
(45) Date of Patent: Jul. 13, 2010

(54) ELECTRICAL CONNECTION BETWEEN FIRST AND SECOND METAL PARTS THAT ARE ELECTRICALLY INSULATED FROM EACH OTHER

(75) Inventors: Cédric Carlavan, Saint Alban la Roche (FR); Philippe Corre, Bouc Bel Air (FR)

(73) Assignee: Eurocopter, Marignane (FR)

( * ) Notice: Subject to any disclaimer, the term of this patent is extended or adjusted under 35 U.S.C. 154(b) by 106 days.

(21) Appl. No.: 12/203,463

(22) Filed: Sep. 3, 2008

(65) Prior Publication Data

US 2009/0227128 A1 Sep. 10, 2009

(30) Foreign Application Priority Data

Sep. 3, 2007 (FR) .................... 07 06150

(51) Int. Cl.
H01R 4/66 (2006.01)
(52) U.S. Cl. ...................................... 439/92
(58) Field of Classification Search .......... 439/92, 439/108, 188; 72/356
See application file for complete search history.

(56) References Cited

U.S. PATENT DOCUMENTS

| | | | | |
|---|---|---|---|---|
| 2,576,437 A | * | 11/1951 | Barry | 72/356 |
| 3,062,495 A | * | 11/1962 | Sloop | 248/205.1 |
| 3,556,570 A | | 1/1971 | Cosenza | |
| 4,557,537 A | * | 12/1985 | Greer | 439/92 |
| 4,565,990 A | * | 1/1986 | Matsui et al. | 338/171 |
| 4,627,673 A | * | 12/1986 | Barrus, Jr. | 439/92 |
| 4,671,583 A | | 6/1987 | Olson | |
| 4,993,959 A | * | 2/1991 | Randolph | 439/92 |

FOREIGN PATENT DOCUMENTS

| | | |
|---|---|---|
| DE | 85 25 078 | 3/1984 |
| FR | 1 083 447 | 1/1955 |
| FR | 2 626 112 | 7/1989 |
| WO | 2005/025005 | 3/2005 |

OTHER PUBLICATIONS

French Search Report dated Mar. 9, 2007, corresponding to FR 07 06150.

* cited by examiner

*Primary Examiner*—Chandrika Prasad
(74) *Attorney, Agent, or Firm*—Young & Thompson

(57) ABSTRACT

An electrical connection (1) for electrically interconnecting adjacent first and second metal parts (2, 3) that are electrically insulated from each other, includes clamping elements (30) together with first and second metal inserts (10, 20) that are arranged respectively in first and second openings (4, 5) formed in the first and second metal parts (2, 3), the first and second inserts (10, 20) being secured to each other by the clamping elements (30) so as to be electrically in contact.

18 Claims, 1 Drawing Sheet

ELECTRICAL CONNECTION BETWEEN FIRST AND SECOND METAL PARTS THAT ARE ELECTRICALLY INSULATED FROM EACH OTHER

The present invention relates to an electrical connection between first and second metal parts that are electrically insulated from each other, the first and second metal parts being coated in paint, for example.

BACKGROUND OF THE INVENTION

More particularly, the electrical connection interconnects first and second metal parts of a rotorcraft electrically, and optionally also mechanically. In general, the techniques that enable an electric current to pass from one electrically insulated metal part to another are referred to by the person skilled in the art as "metallization".

The airframe of a rotorcraft represents the reference electric potential of the rotorcraft, so it is essential for the various pieces of rotorcraft equipment to be electrically connected to said airframe. This grounding of equipment then serves to provide protection against various disturbances, lightning, static electricity, or indeed atmospheric interference, for example.

The airframe of a modern rotorcraft is often made of composite materials, so manufacturers provide metal parts that provide electrically conductive pathways in the panels of the airframe and they then connect the pieces of equipment of the rotorcraft to these electrically conductive pathways.

Unfortunately, two metal parts are often electrically insulated relative to each other. This applies in particular when the outside faces of the metal parts are covered in paint or when grease is placed between said outside faces.

Thus, unless special precautions are taken, these two adjacent metal parts, a piece of equipment, and an electrically conductive pathway will all be electrically insulated relative to one another and they will thus not be electrically interconnected. This situation can also arise when it is desired to fasten one piece of equipment on another piece of equipment, e.g. a filler valve on its support.

Consequently, the electric current generated by lightning and received by a first metal part of a piece of rotorcraft equipment is not conveyed to the rotorcraft airframe by a second metal part even if the first and second metal parts are in contact with each other. Since the first metal part is not connected to the reference potential of the rotorcraft, it is probable that the first metal part will be damaged by the lightning.

It is therefore appropriate that the connection between two metal parts, a piece of equipment, and an electrically conductive pathway, or indeed between two distinct pieces of equipment, for example, can serve firstly optionally to interconnect the two metal parts mechanically, and secondly allow an electric current to flow from one metal part to the other.

In order to remedy that technical problem, the person skilled in the art generally makes use of clamping means screwed into the first and second metal parts.

More precisely, the first metal part has a first top face and a first bottom face, while the second metal part has a second top face and a second bottom face.

Consequently, the first bottom face of the first metal part needs to be in contact with the second top face of the second metal part. In addition, it is appropriate for the first and second metal parts to be electrically interconnected, e.g. because they are coated in paint that insulates them electrically.

The person skilled in the art then drills the first and second metal parts, taps a thread in the holes drilled and interconnects the first and second metal parts by clamping means, e.g. a screw.

Once in the clamping position, the clamping means are thus in contact with the metal of both the first and the second metal parts, insofar as it is screwed into the metal portions of said metal parts.

Consequently, the clamping means provide the electrical connection between the first metal part and the second metal part. Electric current can then pass from the metal portion of the first metal part towards the clamping means, and then from the clamping means towards the metal portion of the second metal part.

The first and second metal parts are thus interconnected electrically in spite of the fact that the metal parts are electrically insulated relative to each other.

Nevertheless, that technique can turn out to be insufficient.

The person skilled in the art then sometimes coats the clamping means in a deposit of aluminum in order to improve electrical connection. Although effective, that solution is nevertheless insufficient for passing a high level of electric current, since the threads of the clamping means covered in the aluminum deposit provide a surface area that is not sufficient for passing the current.

OBJECTS AND SUMMARY OF THE INVENTION

An object of the present invention is to provide an electrical connection between first and second metal parts that enables the above-mentioned limitations to be overcome so as to allow a high level of current to pass between them.

According to the invention, an electrical connection for electrically, and possibly mechanically, interconnecting first and second adjacent metal parts that are electrically insulated from each other, is remarkable in that it comprises clamping means together with first and second metal inserts arranged respectively in first and second openings formed in the first and second metal parts, said first and second inserts being secured to each other by said clamping means so as to be electrically in contact.

The contact area between the first and second inserts is large, so it is then possible to pass a high level of current from one metal part to the other. The electric current no longer passes solely from one metal part to the other via the clamping means, but also, and above all, via the first and second metal inserts.

Advantageously, the first insert is engaged by force in the first metal part, with the second insert being engaged by force in the second part.

The first and second inserts are thus firmly secured respectively to the first and second metal parts.

More precisely, the first insert has a first projecting periphery, the first projecting periphery having a first maximum diameter that is greater than a first inside diameter of the first opening. When the first insert is engaged by force, the first projecting periphery penetrates into the first metal part so as to secure the first insert to said first metal part.

In order to maximize this operation, the first projecting periphery has a plurality of teeth that are pressed into the first metal part while the first insert is being engaged therein by force.

In addition, the first projecting periphery has a first outer shoulder so as to present a first guide zone with a first minimum diameter equal to the first inside diameter of the first opening.

The first insert has a first bottom base and a first top base that are interconnected by a side wall presenting symmetry of revolution, the first shoulder being opened to one of the first bottom or top bases.

The positioning of one of the first shoulders is selected as a function of the direction in which the insert is engaged. In a variant, it is also possible to envisage arranging two first shoulders at opposite axial ends of the first projecting periphery, a first shoulder opening to the first top base while the other first shoulder is placed beside the first bottom base.

Thereafter, an operator presents the base of the first insert provided with the grooved projecting periphery in register with the first opening. At said base, the first minimum diameter of the projecting periphery is equal to the first inside diameter of the first opening.

There is therefore no need to apply force in order to position the first insert.

Similarly, the second insert optionally has a second projecting periphery, the second projecting periphery having a second maximum diameter greater than a second inside diameter of said second opening.

The second projecting periphery is then provided with a plurality of teeth that are pushed into the second metal part during engagement by force of the second insert.

In addition, the second projecting periphery has a second outer shoulder so as to present a second guide zone having a second minimum diameter equal to the second inside diameter of said second opening.

This second opening has a second bottom base and a second top base interconnected by a side wall presenting symmetry of revolution, the second shoulder being opened to one of the second bottom or top bases.

The positioning of the second shoulder is selected as a function of the insert engagement direction. In a variant, it is also possible to envisage arranging two second shoulders at opposite axial ends of the second projecting periphery, one of the second shoulders being open to the second top base, while the other second shoulder is disposed beside the second bottom base.

Furthermore, the first insert has a first bottom base and a first top base interconnected by a first side wall presenting symmetry of revolution about a first passage, the second insert has a second bottom base and a second top base interconnected by a second wall presenting symmetry of revolution about a second passage, and the clamping means secure said first bottom base to said second top base by passing through said first and second passages.

Advantageously, the first top base is countersunk to co-operate with a head of the clamping means. The head of the clamping means therefore does not project proud from the first insert.

In addition, the first side wall has a first groove and the second side wall has a second groove.

This characteristic is of great advantage for several reasons.

When the operator engages an insert by force in a metal part, the insert necessarily removes metal swarf from the metal part.

The swarf then falls between the metal part and the groove of the insert, and therefore does not interfere with proper progress of the insert into the metal part.

Furthermore, the groove imparts a degree of flexibility to the insert, thereby making it easier to engage. The flexibility due to the groove in the insert guarantees good quality contact between the first and second inserts when the clamping means is in position.

Finally, it is advantageous to place a seam of anti-corrosion sealant in the groove of an insert before it is engaged. During engagement, the projecting portion of the insert scratches the opening in the metal part in which the insert is inserted.

The sealant placed previously in the groove then occupies the scratches, thereby effectively protecting the opening in the metal part, e.g. against corrosion.

Furthermore, the first and second passages have respective first and second nominal diameters, with the first nominal diameter being greater than the second nominal diameter.

Consequently, the clamping means, e.g. a screw, do not run any risk of remaining jammed in the first insert and can therefore secure the first and second inserts to each other.

Furthermore, the present invention also provides an electrically interconnected assembly comprising adjacent first and second metal parts that are electrically insulated relative to each other, said first and second metal parts being electrically interconnected by the electrical connection as claimed and as described above.

BRIEF DESCRIPTION OF THE DRAWING

The invention and its advantages appear in greater detail in the context of the following description of an embodiment given by way of illustration with reference to the accompanying figures, in which.

Elements that are present in more than one figure are given the same reference in all of them.

MORE DETAILED DESCRIPTION

Figure 1:
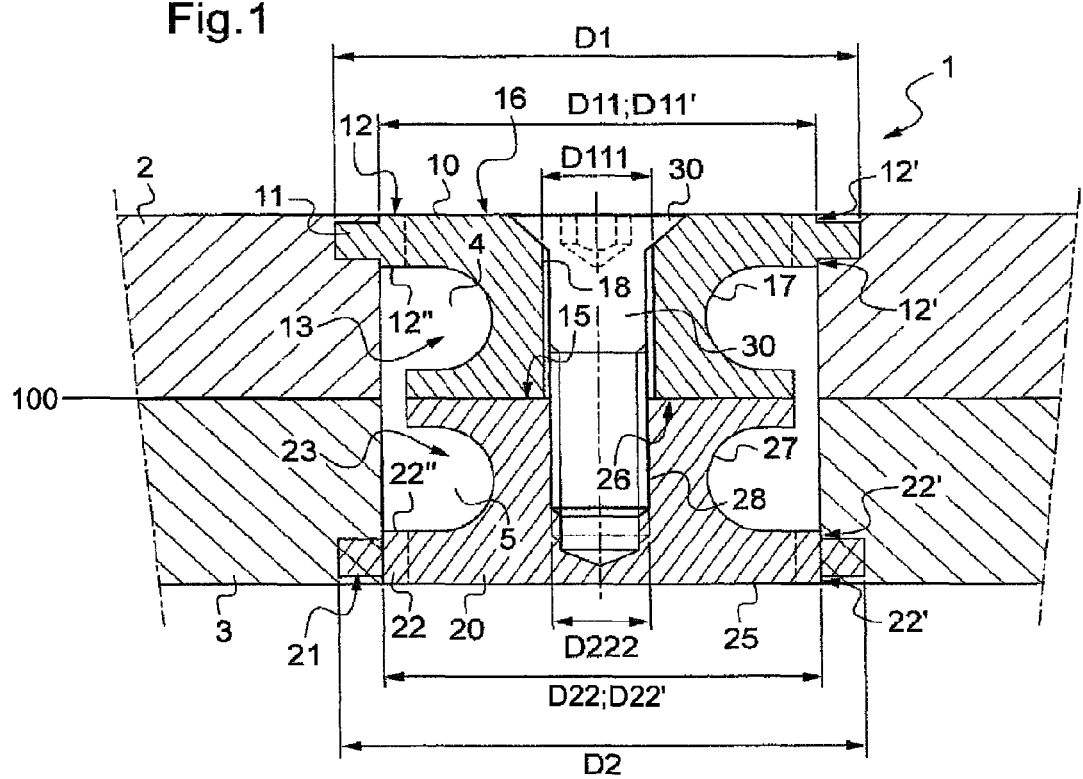
FIG. 1 is a section of first and second metal parts provided with an electrical connection of the invention.

FIG. 1 is a section through first and second metal parts 2 and 3 that are connected together electrically, and possibly also mechanically, by an electrical connection 1.

The first and second metal parts 2 and 3 are in contact with each other. Nevertheless, these first and second metal parts 2, 3 are electrically insulated from each other, e.g. by the paint 100 in which they are coated.

In order to ensure "metallization" the first and second metal parts 2, 3, it is appropriate to connect them together electrically via the electrical connection 1 so that an electric current flowing in the first metal part is conveyed to the second metal part.

This electrical connection 1 is provided with a first insert 10, a second insert 20, and clamping means 30, each of the first and second inserts 10 and 20 presenting symmetry of revolution.

The first insert 10 has a first bottom base 15 and a first top base 16, with a first side wall 17 disposed between the first bottom and top bases 15 and 16.

This first side wall 17 then presents symmetry of revolution about a first passage 18 situated in the center of the first insert 10. This first passage 18 thus passes right through the first insert 10 from the first bottom base 15 to the first top base 16.

Furthermore, the first insert 10 is provided with a first projecting periphery 11 that surrounds one of its ends, specifically the first top base 16.

Figure 2:
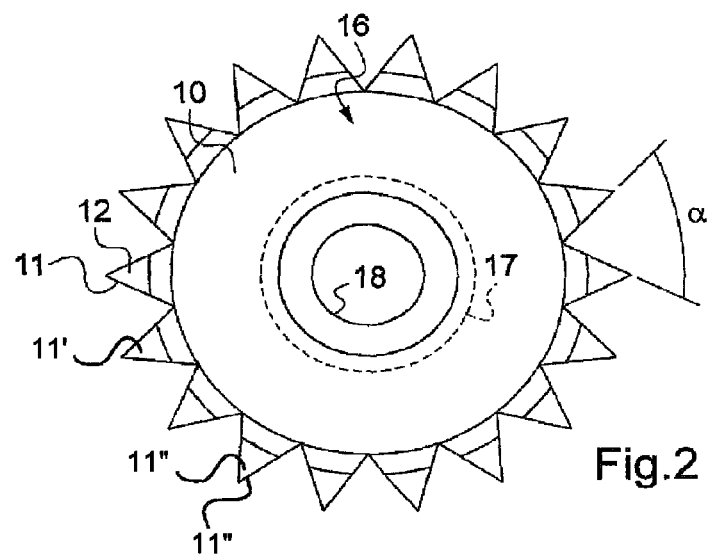
FIG. 2 is a plan view of the first insert of the electrical connection.

With reference to FIG. 2, the first projecting periphery 11 is provided with a plurality of teeth 11' on its circumference. It should be observed that each tooth 11' is made up of two sloping walls 11", a sloping wall of a tooth 11' being separated from the adjacent sloping wall of another tooth 11' by an angle α of the order of 90°.

Furthermore, the first projecting periphery 11 has two outer first shoulders 12, 12". This first projecting periphery 11 then has a first maximum diameter D1 at the ends of its teeth 11' and a first minimum diameter D11 at the ends 12' of the first shoulders 12, 12", the first minimum diameter 11 of the projecting periphery 11 defining a guide zone for the first insert 10.

It should be observed that the first shoulder 12 is open to the outside of the first insert 10 level with the first top base 16. In contrast, the other first shoulder 12" is open to the opposite side, i.e. beside the first bottom base 15.

The variant shown in FIG. 1 has two first shoulders 12, 12", however it need only one of these first shoulders, depending on requirements.

Finally, the first side wall 17 includes a first groove 13.

Consequently, the first insert 10 is engaged by force in the first metal part 2, and more precisely in a first circular opening 4 of the metal part 2.

To begin, the operator presents the first top base 16 in register with the first opening. This first opening has a first inside diameter D11' that is equal to the first minimum diameter D11 of the first projecting periphery 11 level with the first shoulder 12.

This portion of the first projecting portion 11 then constitutes a guide zone of the first insert 10. It should be observed that the other first shoulder 12" could have constituted the guide zone of the first insert 10 if the first insert had been inserted into the first metal part 2 via its first bottom base 15.

The guide zone then positions the first insert 10 ideally relative to the first opening 4.

Once the first insert 10 has been positioned, the operator engages said first insert 10 by force.

The first maximum diameter D1 is greater than the first inside diameter D11" of the first opening, so the teeth 11' of the first projecting periphery 11 are pushed into the first metal part 2.

The metal swarf removed by this forced engagement is then collected inside the first groove 13.

In the same manner, the second insert 20 has a second bottom base 25 and a second top base 26, together with a second side wall 27 that is disposed between the second bottom and top bases 25 and 26.

This second side wall 27 then presents symmetry of revolution about a second passage 28 situated in the center of the second insert 20. This second passage 28 thus passes part of the way through the second insert 20, the second passage 28 starting from the second top base 26 but not reaching the second bottom base 25.

Furthermore, the second insert 20 is provided with a second projecting periphery 21 that surrounds one of its ends, specifically the second bottom base 25.

In addition, the second projecting periphery 21 is provided with a plurality of teeth around its circumference. Each tooth is then made up of two sloping walls, with a sloping wall of one tooth being separated from the adjacent sloping wall of another tooth by an angle of about 90°.

Furthermore, the second projecting periphery 21 has two second outer shoulders 22 and 22". This second projecting periphery 21 then has a second maximum diameter D2 at the ends of its teeth and a second minimum diameter D22 at the end 22' of the second shoulders 22, 22", the second minimum diameter D22 of the second projecting periphery 2 defining a guide zone of the second insert 20.

It should be observed that the second shoulder 22 is open to the outside of the second insert 20 level with the second bottom base 25. In contrast, the other second shoulder 22" is open to the opposite side, i.e. beside the second top base 26.

The variant shown in FIG. 1 has two second shoulders 22 and 22", however it need have only one of these second shoulders, depending on requirements.

Finally, the second side wall 27 has a second groove 23.

Consequently, the second insert 20 is engaged by force in the second metal part 3, more precisely in the second circular opening 5 of the second metal part 3.

Initially, the operator presents the second bottom base 25 so that it faces the second opening 5. This second opening 5 has a second inside diameter D22' that is equal to the second minimum diameter D22 of the second projecting periphery 21 at the second shoulder 22.

This portion of the second projecting periphery 21 then constitutes a guide zone for the second insert 20. It should be observed that the other second shoulder 22" would have constituted the guide zone for the second insert 20 if the second insert had been inserted in the second metal part 3 via its second top base 26.

The guide zone then positions the second insert 20 ideally relative to the second opening 5.

Once the second insert 20 has been positioned, the operator engages the second insert 20 by force.

The second maximum diameter D2 is greater than the second inside diameter D22' of the second opening, so the teeth of the second projecting periphery 21 are pushed into the second metal part 3.

The metal swarf removed during this forced engagement is then collected inside the second groove 23.

Once the first and second inserts 10 and 20 have been arranged in the first and second metal parts 2 and 3, the operator then secures the first metal part 2 to the second metal part 3.

More precisely, the operator secures the first insert 10 to the second insert 20, and consequently secures the first metal part 2 to the second metal part 3, with the help of the clamping means 30 of the electrical connection, e.g. a threaded screw.

The clamping means 30 is then inserted in the first passage 18 and is then screwed into the second passage 28 thus enabling the first bottom base 15 of the first insert 10 to be secured to the second top base 26 of the second insert 20.

In order to ensure that the head 31 of the clamping means 30 does not stand proud of the first insert 10, the first top base 16 is countersunk. The head 31 of the clamping means is then received in the countersink made in this way.

Finally, the first passage 18 has a first nominal diameter D111 that is slightly greater than the second nominal diameter D222 of the second passage 28. The clamping means is dimensioned as a function of the second nominal diameter D222 of the second passage 28 so there is no risk of the clamping means remaining jammed in the first passage 18.

It should be observed that the clamping means 30 may be means that need to be screw-fastened. The second passage 28, and possibly also the first passage 18 is then advantageously tapped so as to be capable of co-operating with the threads of the clamping means 30.

Under such conditions, if the passage is tapped, then the term "nominal diameter" designates the mean diameter lying between the diameter of the bottoms of the threads in the passages and the diameter of the crests of the threads in the passages.

When the clamping means is properly in place, the electrical connection 1 thus does indeed serve to secure the first metal insert 10 mechanically to the second metal insert 20.

In addition, this connection 1 is also, and above all, an electrical connection.

The first and second projecting peripheries 11 and 21 come respectively into contact with the metal portions of the first and second metal parts 2 and 3.

Consequently, if lightning strikes the first metal part, for example, then the current generated by the lightning will be conveyed from the first metal insert 10 via its first projecting periphery 11.

The first bottom base 15 of the first insert 10 is in contact with the second top base 26 of the second insert 20, which is made of metal, so electrical current is then conveyed to the second insert 20, and from there to the second metal part 3 via the second projecting periphery 21.

Naturally, the present invention could be subjected to numerous variant embodiments. Although several embodiments are described above, it will readily be understood that it is not conceivable to identify exhaustively all possible embodiments. It is naturally possible to envisage replacing any of the means described by equivalent means without thereby going beyond the ambit of the present invention.

What is claimed is:

1. An electrical connection (1) for electrically interconnecting first and second adjacent metal parts (2, 3) that are electrically insulated from each other, the connection comprising clamping means (30) together with first and second metal inserts (10, 20) arranged respectively in first and second openings (4, 5) formed in the first and second metal parts (2, 3), at least one insert (10, 20) having a projecting periphery (11, 21) provided with an outer shoulder (12, 12", 22, 22") so as to present a guide zone, said first and second inserts (10, 20) being secured to each other by said clamping means (30) so as to be electrically in contact.

2. An electrical connection according to claim 1, wherein said first insert (10) is engaged by force in said first metal part (2).

3. An electrical connection according to claim 1, wherein said second insert (20) is engaged by force in said second metal part (3).

4. An electrical connection according to claim 1, wherein said first insert (10) has a first projecting periphery (11), said first projecting periphery (11) having a first maximum diameter (D1) greater than a first inside diameter (D11') of said first opening (4).

5. An electrical connection according to claim 4, wherein said first projecting periphery (11) has a first outer shoulder (12, 12") so as to present a first guide zone having a first minimum diameter equal to the first inside diameter (D11') of said first opening (4).

6. An electrical connection according to claim 5, wherein said first insert (10) has a first bottom base (15) and a first top base (16) that are interconnected by a side wall (17) presenting symmetry of revolution, said first shoulder (12, 12") being opened to one of said first bottom or top bases (15 or 16).

7. An electrical connection according to claim 4, wherein said first projecting periphery (11) has a plurality of teeth (11') that are pressed into the first metal part (2) while said first insert (10) is being engaged by force.

8. An electrical connection according to claim 1, wherein said second insert (20) has a second projecting periphery (21), said second projecting periphery (21) having a second maximum diameter (D2) greater than a second inside diameter (D22') of said second opening (5).

9. An electrical connection according to claim 8, wherein said second projecting periphery (21) has a second outer shoulder (22, 22") so as to present a second guide zone having a second minimum diameter equal to the second inside diameter (D22") of said second opening (5).

10. An electrical connection according to claim 9, wherein said second insert (20) has a second bottom base (25) and a second top base (26) interconnected by a side wall (27) having symmetry of revolution, said second shoulder (22, 22") being opened to one of said second bottom or top bases (25 or 26).

11. An electrical connection according to claim 8, wherein said second projecting periphery (21) has a plurality of teeth that are pushed into the second metal part (3) during engagement by force of said second insert (20).

12. An electrical connection according to claim 8, wherein said first insert (10) has a first bottom base (15) and a first top base (16) interconnected by a first side wall (17) having symmetry of revolution about a first passage (18), said second insert (20) has a second bottom base (25) and a second top base (26) interconnected by a second side wall (27) having symmetry of revolution about a second passage (28), and said clamping means (30) secures said first bottom base (15) to said second top base (26) by passing through said first and second passages (18, 28).

13. An electrical connection according to claim 1, wherein said first top base (16) is countersunk to co-operate with a head of said clamping means (30).

14. An electrical connection according to claim 1, wherein said first side wall (17) has a first groove (13).

15. An electrical connection according to claim 1, wherein said second side wall (27) has a second groove (23).

16. An electrical connection according to claim 1, wherein said first and second passages (18, 28) have respective first and second nominal diameters (D111, D222), and said first nominal diameter (D111) is greater than said second nominal diameter (D222).

17. An electrical connection according to claim 12, wherein said second passage (28) passes part of the way through said second insert (20).

18. An electrically interconnected assembly comprising adjacent first and second metal parts (2, 3) that are electrically insulated from each other, wherein said first and second metal parts (2, 3) are connected together electrically by an electrical connection according to claim 1.

* * * * *